US009797719B2

(12) United States Patent
Nishita

(10) Patent No.: US 9,797,719 B2
(45) Date of Patent: Oct. 24, 2017

(54) MEASURING METHOD AND MEASURING INSTRUMENT

(71) Applicant: Kabushiki Kaisha TOPCON, Itabashi-ku, Tokyo-to (JP)

(72) Inventor: Nobuyuki Nishita, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 528 days.

(21) Appl. No.: 14/488,836

(22) Filed: Sep. 17, 2014

(65) Prior Publication Data
US 2015/0092181 A1    Apr. 2, 2015

(30) Foreign Application Priority Data
Oct. 1, 2013 (JP) ................................. 2013-206665

(51) Int. Cl.
*G01C 3/08* (2006.01)
*G01C 1/04* (2006.01)
*G01C 15/00* (2006.01)

(52) U.S. Cl.
CPC ................. *G01C 3/08* (2013.01); *G01C 1/04* (2013.01); *G01C 15/002* (2013.01)

(58) Field of Classification Search
CPC .......... G01C 3/08; G01C 15/00; G01B 11/26; G01B 11/14; G06K 9/36
See application file for complete search history.

(56) References Cited

U.S. PATENT DOCUMENTS 5,162,862 A * 11/1992 Bartram ................. G01S 17/36
                                          342/127
6,559,931 B2 * 5/2003 Kawamura ............ G01C 15/00
                                          348/135
(Continued)

FOREIGN PATENT DOCUMENTS

CN      1818551 A    8/2006
CN    101101209 A    1/2008
(Continued)

OTHER PUBLICATIONS

European communication dated Mar. 20, 2015 in corresponding European patent application No. 14187172.3.
(Continued)

*Primary Examiner* — Luke Ratcliffe
(74) *Attorney, Agent, or Firm* — Nields, Lemack & Frame, LLC

(57) ABSTRACT

The invention provides a measuring method for performing monitoring measurement on two or more objects to be measured by a measuring instrument, which comprises a telescope unit for sighting an object to be measured, a distance measuring unit for projecting a distance measuring light through the telescope unit and for measuring a distance to the object to be measured, an image pickup unit for taking an image by projecting a sighting light in sighting direction and for acquiring digital image, an angle detecting unit for detecting a directional angle in sighting direction of the telescope unit and an automatic sighting unit for carrying out automatic sighting on the object to be measured by the telescope unit, comprising a step of setting up a searching range, a light amount switch-over step of switching over a light amount of projected sighting light to a light amount for a short distance or for a long distance, a short distance searching step of searching the searching range as the light amount for short distance and of performing a coarse (Continued)

measurement on the objects to be measured as positioned at short distance, a long distance searching step of searching the searching range as the light amount for long distance and performing a coarse measurement on the objects to be measured as positioned at long distance and a precise measurement step of carrying out automatic sighting on all objects to be measured based on the result of coarse measurement of the short distance searching and on the result of coarse measurement of the long distance searching and of distance measurement and angle measurement on each of the objects to be measured.

7 Claims, 7 Drawing Sheets

(56) References Cited

U.S. PATENT DOCUMENTS

| | | | |
|---|---|---|---|
| 2003/0048438 | A1 | 3/2003 | Kawamura et al. |
| 2006/0176473 | A1 | 8/2006 | Yasutomi et al. |
| 2006/0239558 | A1 | 10/2006 | Rafii et al. |
| 2008/0018880 | A1 | 1/2008 | Matsuo et al. |
| 2012/0081690 | A1 | 4/2012 | Nagai et al. |
| 2012/0081691 | A1 | 4/2012 | Nagai |
| 2015/0092180 | A1 | 4/2015 | Nishita |

FOREIGN PATENT DOCUMENTS

| | | |
|---|---|---|
| CN | 102445194 A | 5/2012 |
| CN | 102445195 A | 5/2012 |
| EP | 2437028 A2 | 4/2012 |
| EP | 2437030 A2 | 4/2012 |
| EP | 2620746 A1 | 7/2013 |
| JP | 2012-73201 A | 4/2012 |

OTHER PUBLICATIONS

European communication dated Mar. 20, 2015 in corresponding European patent application No. 14187162.4.

Office action dated Jan. 9, 2017 in co-pending U.S. Appl. No. 14/488,744.

Chinese communication dated May 4, 2016 in co-peding Chinese patent application No. 201410516779.2.

Notice of allowance dated May 24, 2017 in co-pending U.S. Appl. No. 14/488,744.

* cited by examiner

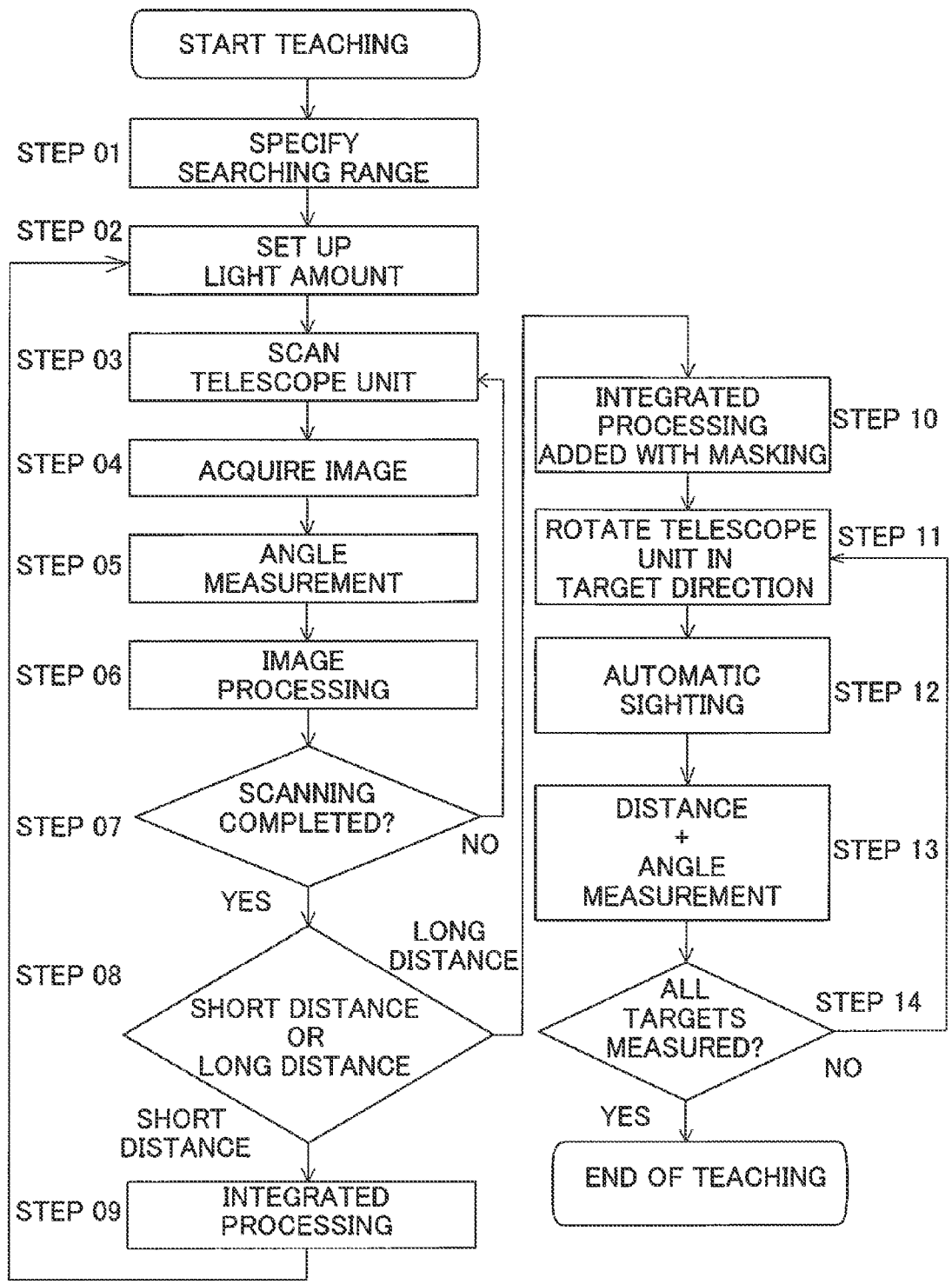

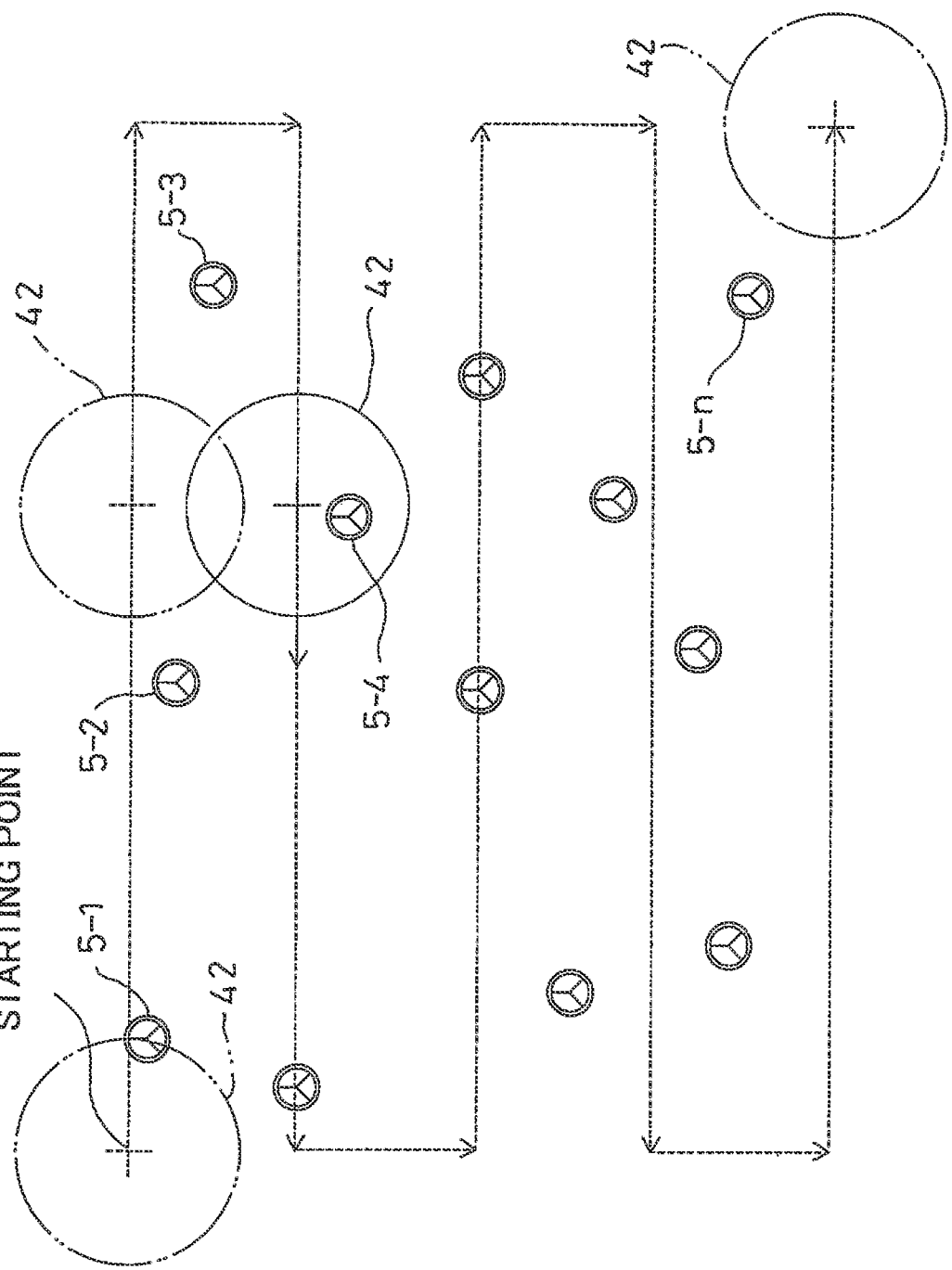

MEASURING METHOD AND MEASURING INSTRUMENT

BACKGROUND OF THE INVENTION

The present invention relates to a measuring method and a measuring instrument which measures a multiple number of points periodically or continuously over time.

For the purposes of observing a sinking of ground, of observing a landslide, of observing a displacement of banks and walls of construction work such as a dam, of observing a displacement of wall surface of a tunnel, a multiple number of measuring points set in a measurement range are measured periodically or continuously over time by a measuring instrument.

For instance, in a case where a tunnel is dug for a construction of an underground railway, for the purpose of observing whether or not the ceiling and the wall surface of the tunnel constructed may not be displaced, a multiple number of prisms are installed as targets on the ceiling and on the wall surface and positional displacement of all the prisms are measured one after another without operator intervention by the measuring instrument (hereinafter referred as "monitoring measurement").

When the monitoring measurement is performed, the measuring instrument automatically searches the prisms, i.e. the measuring points, performs sighting, measures distances and carries out the measuring operation. In order to acquire initial values to search the measuring points as set up, it is necessary to carry out teaching operations on each of the measuring points.

In a conventional teaching operation, an operator sights each of the measuring points by a measuring instrument, measures a horizontal angle, vertical angle and distance for each of the measuring points, performs three-dimensional measurement with respect to each of the measuring points and sets the results of measurement thus obtained as initial values of each measuring point respectively. According to this method, the operator measures the measuring points one by one, and further, a view angle of a sighting telescope provided on the measuring instrument is narrow. This means that much time is required for sighting and the working efficiency is low. As a result, much time is required. In particular, in a case where there are restrictions in terms of time for the measuring operation, e.g. in a case where the operation is performed in a tunnel for an underground railway, the measuring operation must be completed during the time period when the underground railway is not in operation in order to perform monitoring measurement on the ceiling and the wall surface of the tunnel, and so the measuring time is required to be shortened.

In the Japanese Patent Application Publication JP-A-2012-73201, the present applicant discloses a measuring method and a measuring instrument which extensively shortened the teaching operation time and also made an unmanned teaching operation possible by acquiring images at a predetermined time interval while scanning over a preset range, detecting prisms from the images acquired, acquiring an initial value to perform searching by obtaining a coordinate position of the prism (measuring point) and carrying out teaching with respect to each of the prisms.

In general, in the teaching operation, a light amount of a distance measuring light to be projected is fixed, and the measuring instrument automatically scans over a measurement range set up by a distance measuring light with a fixed light amount, searches a prism, i.e. a measuring point, sights the measuring point detected, measures a distance and an angle, and acquires coordinates data of the measuring point required for the teaching.

In this case, a light amount of the distance measuring light is set to a low amount so that a photodetection element receiving a reflection light is not saturated even when the measuring point exists at a short distance. For this reason, it was not possible to carry out the teaching operation for measuring points at a long distance due to the restriction of light amount.

SUMMARY OF THE INVENTION

It is an object of the present invention to provide a measuring method and a measuring instrument, by which it is possible to carry out the teaching operation over a wide range from the short distance to the long distance.

To attain the object as described above, a measuring method according to the present invention performs monitoring measurement on two or more objects to be measured by a measuring instrument, which comprises a telescope unit for sighting an object to be measured, a distance measuring unit for projecting a distance measuring light through the telescope unit and for measuring a distance to the object to be measured, an image pickup unit for taking an image by projecting a sighting light in sighting direction and for acquiring digital image, an angle detecting unit for detecting a directional angle in sighting direction of the telescope unit and an automatic sighting unit for carrying out automatic sighting on the object to be measured by the telescope unit, comprising a step of setting up a searching range, a light amount switch-over step of switching over a light amount of projected sighting light to a light amount for a short distance or for a long distance, a short distance searching step of searching the searching range as the light amount for short distance and of performing a coarse measurement on the objects to be measured as positioned at short distance, a long distance searching step of searching the searching range as the light amount for long distance and performing a coarse measurement on the objects to be measured as positioned at long distance and a precise measurement step of carrying out automatic sighting on all objects to be measured based on the result of coarse measurement of the short distance searching and on the result of coarse measurement of the long distance searching and of distance measurement and angle measurement on each of the objects to be measured, wherein the short distance searching step comprises a scanning step of scanning the searching range through the telescope unit, an image acquiring step of acquiring digital images at a predetermined time interval in the process of scanning, a directional angle measuring step of measuring a directional angle at the time of image acquisition, an image position detecting step of detecting an image of the objects to be measured in the digital image and of detecting an image position of the image of the objects to be measured, and a coarse measurement step of measuring a composite directional angle of each of the objects to be measured based on the result of directional angle measurement and the result of detection of image position, wherein the long distance searching step comprises a scanning step of scanning the searching range through the telescope unit, a digital image acquiring step of acquiring digital image at a predetermined time interval in the process of scanning, a directional angle measuring step of measuring directional angle at the time of image acquisition, an image position detecting step of detecting an image of the object to be measured in the digital images, of performing a masking processing of images on the objects to be measured positioned at a short distance based on the result of the coarse measurement as acquired by the short distance searching and detecting an image position of the image of object to be measured positioned at long distance, and a coarse measurement step of measuring a composite directional angle of each of the objects to be measured based on the result of directional angle measurement and the result of the detection of image position.

Further, in the measuring method according to the present invention, the image acquiring step acquires digital images at a predetermined time interval so that there will be two or more images including a same object to be measured, and wherein the image position detecting step comprises a rectangle setting step of detecting an image of the objects to be measured in the digital image and setting a minimal rectangle surrounding the image of the objects to be measured, an integrated processing step of overlapping the minimal rectangles obtained from two or more digital images and acquiring rectangular data as set up so as to include all of the overlapped rectangles and a step of calculating deviation between a center of a rectangle and a sighting axis based on the rectangular data as acquired.

Further, the measuring method according to the present invention further comprises a precise measurement step of making the telescope unit to automatically sight on the objects to be measured sequentially based on the directional angle as stored and performing a distance measurement and an angle measurement, and a step of associating measurement results obtained by the precise measurement with the objects to be measured and acquiring the measurement results as initial value.

Further, a measuring instrument according to the present invention comprises a telescope unit for sighting an object to be measured, a distance measuring unit for projecting a distance measuring light through the telescope unit and for measuring a distance to the object to be measured, an image pickup unit for taking images in sighting direction and for acquiring digital image, an angle detecting unit for detecting a directional angle in sighting direction of the telescope unit, an automatic sighting unit for carrying out automatic sighting on the object to be measured by the telescope unit, an arithmetic processing part, and a storage part, wherein the distance measuring unit can change the light amount of the distance measuring light for short distance and for long distance, the arithmetic processing part rotates the telescope unit in horizontal direction and in vertical direction respectively with light amount for short distance and with light amount for long distance, scans in a predetermined range as set so as to include two or more objects to be measured, acquires digital images at the predetermined time interval so that there will be two or more images including the same object to be measured, detects the objects to be measured in the digital image, calculates a composite directional angle of the objects to be measured based on detection results of the angle detecting unit at the time of image acquisition and based on position of the image of the object to be measured in the digital image, makes the storage part store composite directional angle of the object to be measured as target value for automatic sighting by associating with each of the objects to be measured, and further, the arithmetic processing part performs masking processing based on composite directional angle acquired at short distance and restricts the acquisition of composite directional angles of the object to be measured as positioned at short distance in a case where a composite directional angle of the object to be measured is calculated by the light amount for long distance.

Further, in the measuring instrument according to the present invention, the arithmetic processing part sets up a minimal rectangle surrounding the image of the object to be measured, overlaps the minimal rectangles obtained at two or more digital images and acquires a data of rectangle as set up so that all of the overlapped rectangles are included, calculates a composite directional angle of each of the objects to be measured respectively based on a deviation between the center of rectangle as obtained based on the rectangular data and a sighting axis and based on the detection result from the angle detecting unit, associates the composite directional angle with each of the objects to be measured, and makes the storage part store directional angles of the objects to be measured as target values for automatic sighting.

Furthermore, in the measuring instrument according to the present invention, the arithmetic processing part makes the automatic sighting unit sequentially execute automatic sighting on the telescope unit to the objects to be measured based on the target value stored in the storage part, execute a precise measurement for distance measurement and angle measurement and associates the results of measurement obtained by the precise measurement with the objects to be measured and acquires the results of measurement as initial value.

According to the present invention, the measuring method performs monitoring measurement on two or more objects to be measured by a measuring instrument, which comprises a telescope unit for sighting an object to be measured, a distance measuring unit for projecting a distance measuring light through the telescope unit and for measuring a distance to the object to be measured, an image pickup unit for taking an image by projecting a sighting light in sighting direction and for acquiring digital image, an angle detecting unit for detecting a directional angle in sighting direction of the telescope unit and an automatic sighting unit for carrying out automatic sighting on the object to be measured by the telescope unit, comprising a step of setting up a searching range, a light amount switch-over step of switching over a light amount of projected sighting light to a light amount for a short distance or for a long distance, a short distance searching step of searching the searching range as the light amount for short distance and of performing a coarse measurement on the objects to be measured as positioned at short distance, a long distance searching step of searching the searching range as the light amount for long distance and performing a coarse measurement on the objects to be measured as positioned at long distance and a precise measurement step of carrying out automatic sighting on all objects to be measured based on the result of coarse measurement of the short distance searching and on the result of coarse measurement of the long distance searching and of distance measurement and angle measurement on each of the objects to be measured, wherein the short distance searching step comprises a scanning step of scanning the searching range through the telescope unit, an image acquiring step of acquiring digital images at a predetermined time interval in the process of scanning, a directional angle measuring step of measuring a directional angle at the time of image acquisition, an image position detecting step of detecting an image of the objects to be measured in the digital image and of detecting an image position of the image of the objects to be measured, and a coarse measurement step of measuring a composite directional angle of each of the objects to be measured based on the result of directional angle measurement and the result of detection of image position, wherein the long distance searching step comprises a scanning step of scanning the searching range through the telescope unit, a digital image acquiring step of acquiring digital image at a predetermined time interval in the process of scanning, a directional angle measuring step of measuring directional angle at the time of image acquisition, an image position detecting step of detecting an image of the object to be measured in the digital images, of performing a masking processing of images on the objects to be measured positioned at a short distance based on the result of the coarse measurement as acquired by the short distance searching and detecting an image position of the image of object to be measured positioned at long distance, and a coarse measurement step of measuring a composite directional angle of each of the objects to be measured based on the result of directional angle measurement and the result of the detection of image position. As a result, from the objects to be measured at short distance to the objects to be measured at long distance, all objects are included as the objects for the teaching, and also objects for monitoring, and the range of measurement can be extremely expanded.

Further, according to the present invention, in the measuring method, the image acquiring step acquires digital images at a predetermined time interval so that there will be two or more images including a same object to be measured, and wherein the image position detecting step comprises a rectangle setting step of detecting an image of the objects to be measured in the digital image and setting a minimal rectangle surrounding the image of the objects to be measured, an integrated processing step of overlapping the minimal rectangles obtained from two or more digital images and acquiring rectangular data as set up so as to include all of the overlapped rectangles and a step of calculating deviation between a center of a rectangle and a sighting axis based on the rectangular data as acquired. As a result, an accurate directional angle of an object to be measured can be measured even when a perfect image of the object to be measured cannot be acquired.

Further, according to the present invention, the measuring method further comprises a precise measurement step of making the telescope unit to automatically sight on the objects to be measured sequentially based on the directional angle as stored and performing a distance measurement and an angle measurement, and a step of associating measurement results obtained by the precise measurement with the objects to be measured and acquiring the measurement results as initial value. As a result, it is possible to perform the monitoring measurement efficiently with respect to the objects to be measured which exist over a wide range.

Further, according to the present invention, the measuring instrument comprises a telescope unit for sighting an object to be measured, a distance measuring unit for projecting a distance measuring light through the telescope unit and for measuring a distance to the object to be measured, an image pickup unit for taking images in sighting direction and for acquiring digital image, an angle detecting unit for detecting a directional angle in sighting direction of the telescope unit, an automatic sighting unit for carrying out automatic sighting on the object to be measured by the telescope unit, an arithmetic processing part, and a storage part, wherein the distance measuring unit can change the light amount of the distance measuring light for short distance and for long distance, the arithmetic processing part rotates the telescope unit in horizontal direction and in vertical direction respectively with light amount for short distance and with light amount for long distance, scans in a predetermined range as set so as to include two or more objects to be measured, acquires digital images at the predetermined time interval so that there will be two or more images including the same object to be measured, detects the objects to be measured in the digital image, calculates a composite directional angle of the objects to be measured based on detection results of the angle detecting unit at the time of image acquisition and based on position of the image of the object to be measured in the digital image, makes the storage part store composite directional angle of the object to be measured as target value for automatic sighting by associating with each of the objects to be measured, and further, the arithmetic processing part performs masking processing based on composite directional angle acquired at short distance and restricts the acquisition of composite directional angles of the object to be measured as positioned at short distance in a case where a composite directional angle of the object to be measured is calculated by the light amount for long distance. As a result, from the objects to be measured at short distance to the objects to be measured at long distance, all objects are included as the objects for the teaching, and also objects for monitoring, and the range of measurement can be extremely expanded.

Further, according to the present invention, in the measuring instrument, the arithmetic processing part sets up a minimal rectangle surrounding the image of the object to be measured, overlaps the minimal rectangles obtained at two or more digital images and acquires a data of rectangle as set up so that all of the overlapped rectangles are included, calculates a composite directional angle of each of the objects to be measured respectively based on a deviation between the center of rectangle as obtained based on the rectangular data and a sighting axis and based on the detection result from the angle detecting unit, associates the composite directional angle with each of the objects to be measured, and makes the storage part store directional angles of the objects to be measured as target values for automatic sighting. As a result, an accurate directional angle of an object to be measured can be measured even when a perfect image of the object to be measured cannot be acquired.

Furthermore, according to the present invention, in the measuring instrument, the arithmetic processing part makes the automatic sighting unit sequentially execute automatic sighting on the telescope unit to the objects to be measured based on the target value stored in the storage part, execute a precise measurement for distance measurement and angle measurement and associates the results of measurement obtained by the precise measurement with the objects to be measured and acquires the results of measurement as initial value. As a result, it is possible to efficiently perform the monitoring measurement with respect to the objects to be measured which exist over a wide range.

BRIEF DESCRIPTION OF THE DRAWINGS

FIG. 4 is a flowchart of an embodiment of the present invention.

FIG. 5 is an explanatory drawing to show a relation between a scanning locus, a field of view of a telescope unit and a reflection target in the present embodiment.

DETAILED DESCRIPTION OF THE PREFERRED EMBODIMENT

Description will be given below on an embodiment of the present invention by referring to the attached drawings.

First, referring to FIG. 1, description will be given on a measuring system which comprises a measuring instrument according to an embodiment of the present invention.

Figure 1:
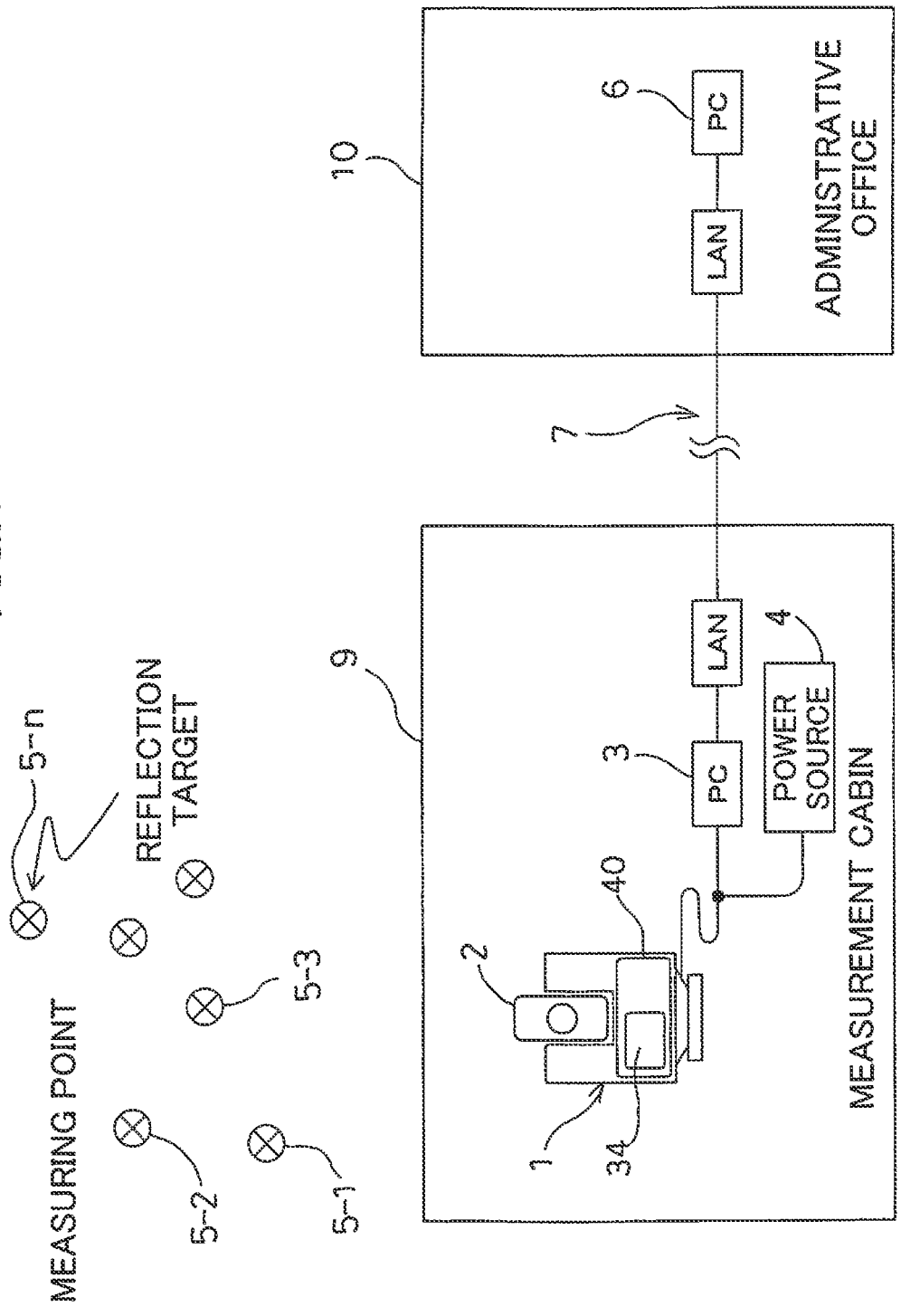
FIG. 1 is a drawing to show system configuration, which includes a measuring instrument according to an embodiment of the present invention.

In FIG. 1, reference numeral 1 denotes a measuring instrument to be installed in a measurement cabin 9. The measuring instrument 1 is provided with a telescope unit 2 and can rotate the telescope unit 2 in horizontal direction and in vertical direction and has an automatic sighting function. Reference numeral 3 denotes a measuring instrument PC, and the measuring instrument PC 3 is electrically connected to the measuring instrument 1 or is integrated with the measuring instrument 1 and issues instructions relating to the measurement. Further, the measuring instrument PC 3 accumulates measurement data obtained by the measuring instrument 1 or transmits the measurement data to a base station PC 6. Reference numeral 4 denotes a power source, and the power source 4 supplies electric power to the measuring instrument 1 and the measuring instrument PC 3. It is to be noted that although not shown in the figure, the measuring instrument 1 has a horizontal angle measuring unit 32 (see FIG. 3) and a vertical angle measuring unit 31 (see FIG. 3). Further, reference numerals 5-1, 5-2, 5-3, ... , 5-n each denotes an object to be measured installed at a measuring point. It is to be noted that as the object to be measured, a reflective target having retro-reflectivity is used, and further, as a reflection target, a prism, a reflective sheet, or the like are used.

The base station PC 6 is installed at an administrative office 10 or the like to manage and administer tunnels, dams, etc. The base station PC 6 accumulates monitoring data transmitted from the measuring instrument PC 3, compares the received monitoring data with the monitoring data obtained in the past, and judges the present state of tunnels, dams, etc.

The measuring instrument PC 3 and the base station PC 6 can transmit and receive data communication to and from each other via a communication means 7 as required such as LAN, wireless communication, etc.

Figure 2:
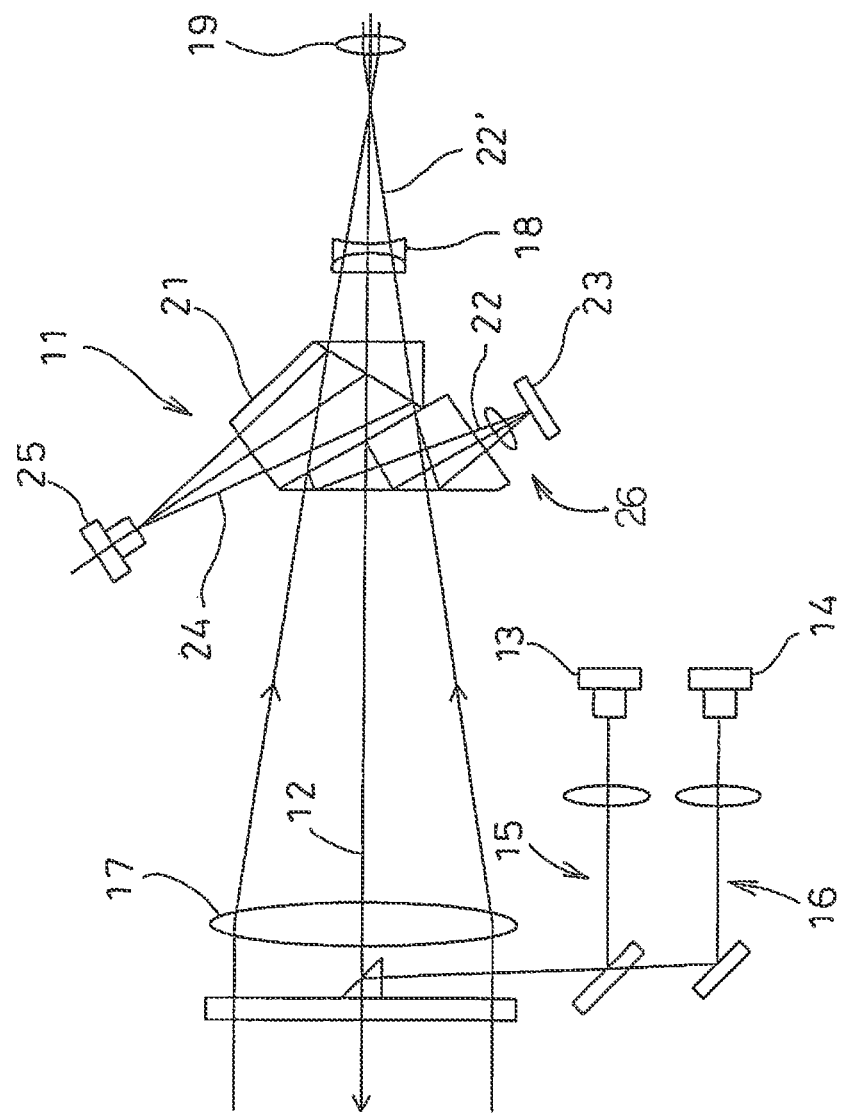
FIG. 2 is a system diagram of an optical system provided on the measuring instrument.

FIG. 2 shows an optical system 11 of the measuring instrument 1 and the optical system 11 is designed to have a fixed magnification factor. In FIG. 2, reference numeral 12 denotes an optical axis (visual axis) of the optical system 11, reference numeral 13 denotes a light source for distance measurement, reference numeral 14 denotes a light source for sighting, reference numeral 15 denotes a first light projecting optical system for guiding a distance measuring light from the light source 13 for distance measurement to the optical axis 12, reference numeral 16 denotes a second light projecting optical system for guiding a sighting light from the light source 14 for sighting to the optical axis 12, reference numeral 17 denotes an objective lens disposed on the optical axis 12, reference numeral 18 denotes a focus lens disposed on the optical axis 12, and reference numeral 19 denotes an eye piece.

The light source 13 for distance measurement is designed to emit a visible light as a distance measuring light, and the light source 14 for sighting emits an invisible light such as infrared light as a sighting light. The distance measuring light emitted from the light source 13 for distance measurement and the sighting light emitted from the light source 14 for sighting are projected on the optical axis 12 respectively. A reflection light of the distance measuring light (hereinafter referred as a "reflected distance measuring light") and a reflection light of the sighting light (hereinafter referred as a "reflected sighting light") enter the objective lens 17 and are converged.

On the optical axis 12, a dichroic prism 21 is provided. The dichroic prism 21 reflects a reflected sighting light 22 on one reflection surface, and the reflected sighting light 22 is separated by the dichroic prism 21. The reflected sighting light 22 thus separated enter an image sensor 23.

Further, the dichroic prism 21 reflects a reflected distance measuring light 24 on the other reflection surface and the reflected distance measuring light 24 is separated. The reflected distance measuring light 24 thus separated enters a photodetection element 25 for distance measurement. A natural light 22' passes through the dichroic prism 21, and the natural light 22' after passing through enters the eye piece 19 through the focus lens 18.

The image sensor 23 is a CCD, a CMOS sensor, etc. for instance, which is an aggregate of pixels, and each pixel is designed so that each pixel can be specified on a light receiving surface (i.e. image pickup surface). Further, the image sensor 23 is so arranged that the center of the image sensor 23 coincide with the optical axis 12.

Further, a position of each of the pixels is specified by rectangular coordinates, which have the optical axis 12 as the origin. By obtaining the position of a predetermined pixel (coordinates) on the image sensor 23, a field angle of the predetermined pixel with respect to the optical axis 12 (i.e. an angle with respect to the optical axis as obtained from the position of the pixel) can be acquired. The optical system 11, the image sensor 23, etc. make up together an image pickup unit 26, and the image pickup unit 26 acquires a digital image via the image sensor 23.

In the present embodiment, an image of the reflection target 5 is detected from a digital image acquired by the image sensor 23, and based on the image of the reflection target 5, a position of the reflection target 5 on the image is obtained, and from a relative relation between the position and the optical axis 12, a vertical angle and a horizontal angle with respect to the optical axis 12 is obtained. Further, each of a vertical angle and a horizontal angle of the optical axis 12 are measured by the vertical angle measuring unit 31 and the horizontal angle measuring unit 32 respectively, and based on the vertical angle and the horizontal angle of the optical axis 12 and the vertical angle and the horizontal angle in the image sensor 23, it is designed so that a position of the reflection target 5 (i.e. a vertical angle and a horizontal angle) is detected.

Figure 3:
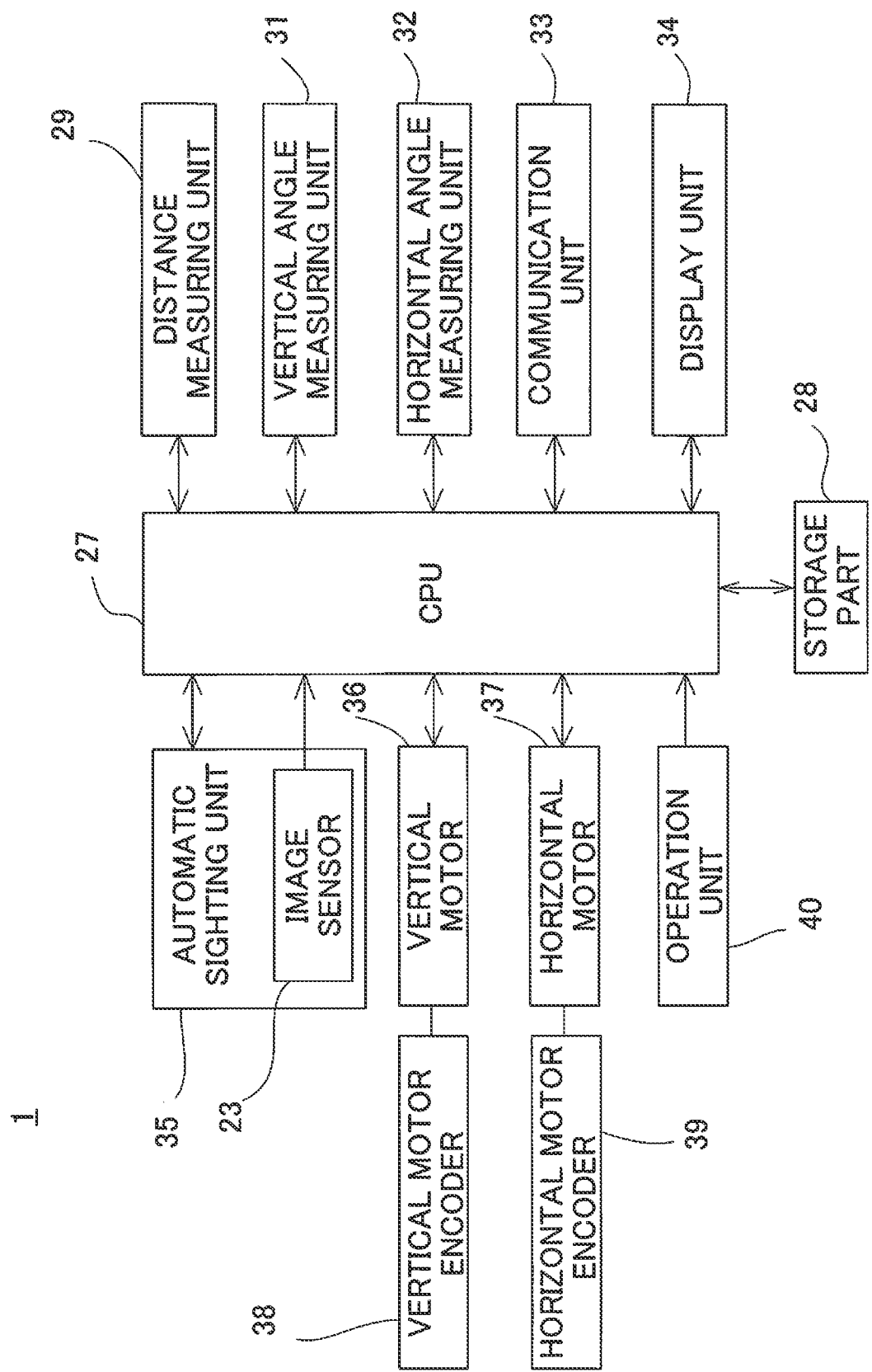
FIG. 3 is a schematical block diagram of the measuring instrument.

FIG. 3 is a block diagram to show an approximate system configuration of the measuring instrument 1. In FIG. 3, reference numeral 27 denotes an arithmetic processing part typically represented by CPU, reference numeral 28 denotes a storage part, reference numeral 29 denotes a distance measuring unit, reference numeral 31 denotes a vertical angle measuring unit, reference numeral 32 denotes a horizontal angle measuring unit, reference numeral 33 denotes a communication unit, reference numeral 34 denotes a display unit, reference numeral 35 denotes an automatic sighting unit, reference numeral 36 denotes a vertical motor for rotating the telescope unit 2 in vertical direction, reference numeral 37 denotes a horizontal motor for rotating the telescope unit 2 in horizontal direction, reference numeral 38 denotes a vertical motor encoder installed on the vertical motor 36, reference numeral 39 denotes a horizontal motor encoder installed on the horizontal motor 37, and reference numeral 40 denotes an operation unit.

The distance measuring unit 29 comprises the light source 13 for distance measurement, the photodetection element 25 for distance measurement, the arithmetic processing part 27, the storage part 28, etc. The distance measuring unit 29 performs distance measurement based on a reflected distance measuring light received by the photodetection element 25 for distance measurement.

The automatic sighting unit 35 comprises the light source 14 for sighting, the image sensor 23, the arithmetic processing part 27, the storage part 28, etc. At the automatic sighting unit 35, the reflected sighting light from the reflection target 5 is received by the image sensor 23. Based on the result of photodetection, an automatic sighting is performed to make the sighting optical axis coincide with the reflection target 5.

The vertical angle measuring unit 31 measures a vertical angle of the sighting optical axis of the telescope unit 2 and transmits the measurement result to the arithmetic processing part 27 as an electric signal. The horizontal angle measuring unit 32 has a reference point and measures a horizontal angle of the sighting optical axis with respect to the reference point, and the result of measurement is transmitted to the arithmetic processing part 27.

The vertical motor 36 and the horizontal motor 37 are driven and controlled by the arithmetic processing part 27. A rotation amount and a rotation speed of the vertical motor 36 are detected by the vertical motor encoder 38 installed on the vertical motor 36, and a rotation amount and a rotation speed of the horizontal motor 37 are detected by the horizontal motor encoder 39 installed on the horizontal motor 37.

According to a program (to be described later) stored in the storage part 28, the arithmetic processing part 27 performs a switching-over of a short distance teaching control and a long-distance teaching control, performs image processing with respect to acquired images, performs distance measurement by driving the distance measuring unit 29, performs automatic sighting by driving the automatic sighting unit 35 and performs three-dimensional measurement for each of the reflection targets 5 respectively based on the measurement results from the distance measuring unit 29, the vertical angle measuring unit 31 and the horizontal angle measuring unit 32. The obtained measurement results are transmitted to the measuring instrument PC 3.

In the storage part 28, various types of programs are stored. These programs include, for instance: a program for performing a switching-over of a short distance teaching control and a long distance teaching control, a measurement program for making the measuring instrument 1 perform the measuring operation and for acquiring three-dimensional data of the measuring points (i.e. the reflection target 5), or a sequence program for sequentially searching the measuring points and for carrying out operation such as acquisition of images by the image sensor 23, an image processing program for detecting the reflection target image from a digital image acquired by the image sensor 23, a program for detecting a reflection target position on the image by performing image processing on the detected reflection target image, a target position measuring program for obtaining a position (i.e. a horizontal angle and a vertical angle) of the reflection target 5 based on the reflection target position on the image, an automatic sighting program for sighting the telescope unit 2 on the reflection target 5 based on the position of the reflection target 5 as measured, or a teaching program for executing a teaching based on the data as measured on each of the reflection targets 5 by executing the automatic sighting program and the measurement program, or a monitoring program for executing the automatic sighting program and the measurement program at a predetermined time interval based on the teaching results, for detecting a position of each measuring point and for storing the detection results in time series at the storage part 28, and other types of programs.

Next, description will be given on the measuring instrument PC 3.

The measuring instrument 1 executes the teaching or the monitoring and thereby the measuring point data acquired are transmitted to the measuring instrument PC 3. The measuring instrument PC 3 stores the measuring point data in time series interrelating to each of the reflection targets 5 in time series.

Further, the measuring instrument PC 3 has programs such as a control program for making the measuring instrument 1 carry out the teaching or the monitoring and an abnormality judging program for calculating based on the measurement data as to whether there is a displacement or not and as to the extent of displacement for each of the reflection targets (measuring points) and for judging whether there is any abnormality or not.

By referring to FIG. 4, description will be given on the teaching operation of the present embodiment.

In the present embodiment, a short distance searching and a long distance searching are performed.

(Step 01) A range where a reference point and a measuring point are present (i.e. searching range) is specified. As an actual method for specifying the range, as an example, the telescope unit 2 is directed toward the position of a starting point and a finishing point for performing the teaching operation, and an angle measurement value at that time are acquired from the vertical angle measuring unit 31 and the horizontal angle measuring unit 32. To direct the telescope unit 2 toward positions of the starting point and the finishing point where the teaching operation is carried out, the operator may directly operate the telescope unit 2 or the telescope unit 2 may be moved by remote control from the measuring instrument PC 3. Or, the angle measurement value may be directly specified from the operation unit 40 of the measuring instrument 1 or the angle measurement value may be specified by remote control from the measuring instrument PC 3. In a case where the display unit 34 is a touch panel, the starting point and the finishing point are set up on the display unit 34.

In a case where the reference points and the measuring points are present over a total circumference, or are present in a wide range, the starting point position and the finishing point position are not specified, and by rotating the telescope unit 2 over an angle of 360° with respect to the vertical axis, the teaching may be performed over the total circumference. What is important is that the specifying is made for a range a little wider than the range where the reference points and the measuring points are present so that all of the reflection targets 5 can be discovered in a reliable manner.

(Step 02) When the specification of the searching range has been completed, a light amount of the sighting light issued for the purpose of searching is set up. As the light amount to be set up, the light amount is set up to either a light amount (e.g. maximum light amount) for long distance searching which can detect a sighting light reflected by the reflection target 5 located at the most distant point existing in the searching range or a light amount (little light amount) for short distance searching which detect a reflected light from a reflection target 5 closer than a predetermined distance. In the present embodiment, a long distance searching and a short distance searching are performed, and first a light amount for short distance searching is set for short distance searching.

(Step 03) When the setting of light amount is completed, searching is performed according to a scanning pattern as set up in advance.

For the searching, the vertical motor 36 and the horizontal motor 37 are driven by using the searching function of the measuring instrument 1. The telescope unit 2 is reciprocally scanned at a predetermined speed in horizontal direction, and is rotated at a predetermined speed in vertical direction by a predetermined angle at the horizontal scanning ends. By the reciprocal scanning in horizontal direction and the rotation in vertical direction at the horizontal scanning ends, the searching range can be scanned without any omissions. At this time, the predetermined rotation angle in vertical direction is set up to an angle smaller than the view angle in vertical direction of a field of view 42 (see FIG. 5) of the telescope unit 2 so that the field of view in the upper scanning and the field of view in the lower scanning are overlapped on each other in a range as required.

(Step 04) During the scanning process, digital image data are acquired by the image pickup unit 26 at a predetermined time interval, and the acquired digital images are stored in the storage part 28. There are no specific limitations to the scanning pattern, but since the field of view 42 of the telescope unit 2 is in circular shape, in a case where the reflection target 5 is present near an upper or a lower end of the field of view 42 of the telescope unit 2, under a condition where scanning is performed in horizontal direction for instance, the reflection target 5 enters inside the field of view 42 only for a single moment. For this reason, there may be possibilities that the image of the reflection target 5 cannot be acquired, so, in a case where the scanning is performed in horizontal direction, scanning is performed with a little overlapping in up-to-down direction of the field of view 42 (see FIG. 5). Similarly, in a case where the scanning is performed in vertical direction, the time interval and the scanning speed to acquire the images are set up so that the images can be acquired with a little overlapping in left-to-right direction of the field of view 42.

Further, the relation between the scanning speed in the horizontal direction and the time interval of the image acquisition is set up in such manner that a plurality of the same target, namely, so as to appear in at least two or more of images.

(Step 05) When the image is acquired in Step 04, a horizontal angle and a vertical angle (hereinafter the term "directional angle" is used for both of the horizontal angle and the vertical angle) are measured in synchronization with the acquisition of the image, and the directional angle associated with the acquired image and is stored in the storage part 28.

(Step 06) Image processing is performed on each of the images stored in the storage part 28. It is confirmed whether or not the reflection target image is present or not in the image. Further, from the images including the reflection target image, the reflection target image is detected. Further, a position in the images of the reflection target image in each of the images (i.e. a position on the photodetection surface of the image sensor 23) is obtained.

It is to be noted that because the light amount of the sighting light is set low in the short distance searching, there may be a case where a reflection light enough to recognize the target may not be obtained from the reflection target 5 positioned at long distance, however, the light amount of the reflection light from the reflection target 5 positioned at short distance will be such that it does not saturate the image sensor 23.

Further, because the optical system 11 has a fixed magnification factor, the reflected target image will be in such a size that the reflection target corresponds to the distance. Thus, a small target image is obtained for the reflected target 5 at long distance, and a large reflection target image is obtained at short distance.

Therefore, by judging the size of the reflection target image, an approximate distance of the reflection target 5 corresponding to the reflection target image can be judged. For instance, if it is assumed that a short distance searching is for a distance within 100 meters, and a long distance searching is for a distance of 100 meters or more, the reflection target 5 detected by short distance searching and the reflection target 5 detected by long distance searching are switched over by setting the size of the reflected target image obtained at a distance of 100 meters as the judging standard.

(Step 07) The procedures in Step 03 to Step 06 is repeated until the scanning with respect to the entire searching range is completed.

(Step 08) When the scanning for all of the searching range has been completed, it is judged as to whether the searching thus completed is a short distance searching or a long distance searching.

(Step 09) When it is judged that the short distance searching has been completed, integrated processing is performed based on an image including the reflection target image acquired by the short distance searching, a directional angle associated with the image and a position of the reflection target image in the image. Here, the image, which is to be an object of the integrated processing, is judged as a target positioned at short distance by the size of the reflected target image.

Further, the integrated processing is a processing for measuring an accurate directional angle (hereinafter referred as a composite directional angle) of a reflection target by giving further consideration to a position of the reflection target image in the image.

By referring to FIG. 6A to FIG. 6C, description will be given below on the integrated processing.

First, description will be given on image processing and on obtaining of the position of the reflection target image in the image. FIG. 6A shows a relation between the field of view 42, a photodetecting area 43 and a reflection target image 44 in an image acquired while scanning. Further, FIG. 6A shows a case where the same reflection targets 5 are included in three images.

Figure 6A:
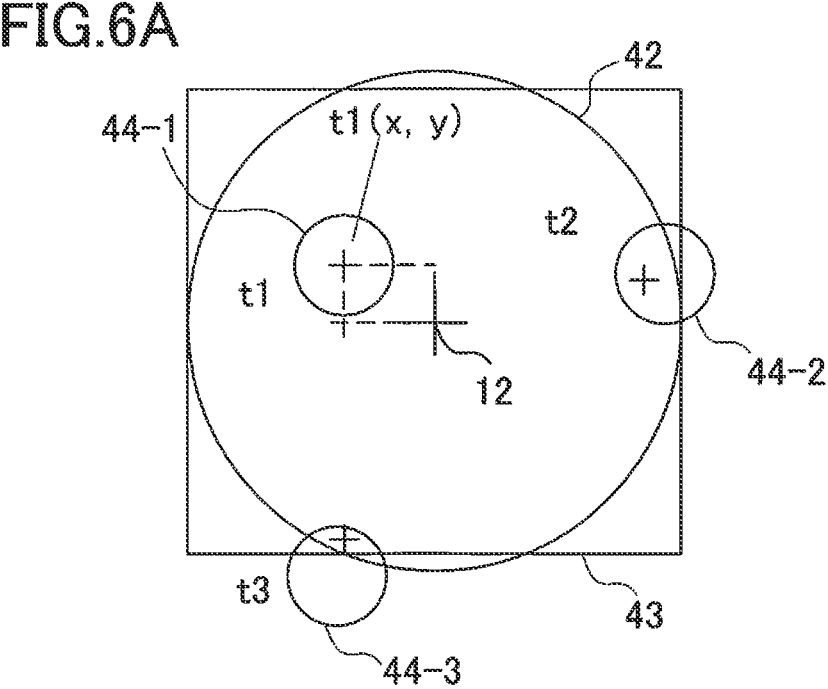
FIG. 6A is a drawing to show a relation between a field of view, a photodetecting area and a reflection target image in an image acquired while scanning.

It is to be noted that in FIG. 6A, three of the reflection target images 44 in one image are shown, but in fact, one of the reflection target images 44 is included in one image. FIG. 6A shows a condition where three images are overlapped with each other with the optical axis as the center.

Images are acquired at each of the times t1, t2 and t3 respectively. A reflection target image 44-1 is included in the image acquired at the time t1 (hereinafter referred as "image t1"), a reflection target image 44-2 is included in the image acquired at the time t2 (hereinafter referred as "image t2")

and a reflection target image 44-3 is included in the image acquired at time t3 (hereinafter referred as "image t3").

Due to the timing of the photographing, the reflection target image 44-1 is a perfect image, while the reflection target image 44-2 and the reflection target image 44-3 are respective images which have lacking portions.

Figure 6B:
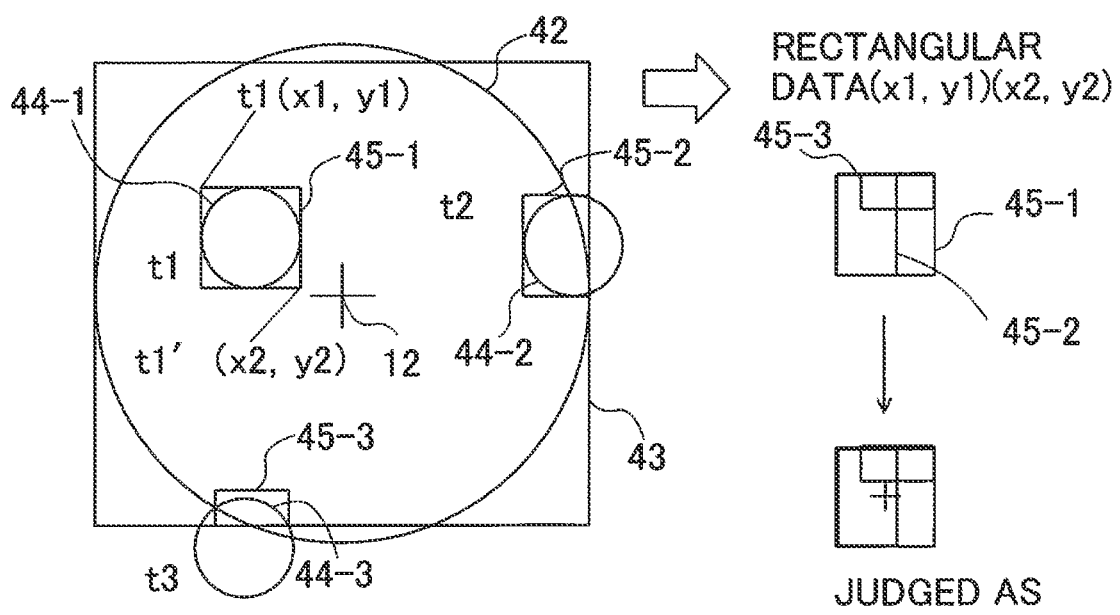
FIG. 6B is an explanatory drawing to show an image processing for measuring a position of a reflection target image.

As shown in FIG. 6B, for each image, a minimum rectangle surrounding the reflection target image 44 is set up (rectangle recognition), which is captured in the field of view 42 and is included within the photodetection area 43. According to an example of FIG. 6B, the entire image of the reflection target image 44-1 within the image t1 is included in the image t1 and is an image in perfect circular shape. The minimum rectangle 45-1 surrounding the reflection target image 44-1 is in form of a square, which is in contact with the reflection target image 44-1. Further, an area of the rectangle 45-1 at this moment is the largest among the rectangles surrounding the reflection target image. It is to be noted that in a case where the reflection target image 44 is obtained by an ellipse or the like, the rectangle corresponds to a shape of an ellipse.

Further, when the rectangle 45-1 is obtained, coordinates t1 (x1, y1) and t1' (x2, y2) at positions of diagonal vertexes of the rectangle 45-1 are obtained. The coordinates in this case become coordinates within the photodetection area 43 having the optical axis 12 as an origin.

Similarly, a smallest rectangle 45-2 surrounding the reflection target image 44-2 in the image t2 is set up. The rectangle 45-2 in this case lacks a right-side portion of the reflection target image 44-2 and is a longitudinal rectangle. Further, coordinates of a diagonal vertex of the rectangle 45-2 are acquired.

Further, a minimum rectangle 45-3 surrounding the reflection target image 44-3 in the image t3 is set up. The reflection target image 44-3 in this case lacks most of its part, and only the right upper portion of the reflection target image 44-3 is a portion where the field of view 42 and the photodetection area 43 are included in common. Accordingly, the rectangle 45-3 is a small rectangle longer in horizontal direction. Similarly, coordinates of a diagonal vertex of the rectangle 45-3 are acquired. The coordinates of a diagonal vertex become a rectangular data showing a position of the rectangle and a size and a shape of the rectangle.

It is to be noted that which of the sets is to be chosen among the two sets of coordinates of a diagonal vertex is selected adequately, depending on the condition of the reflection target image 44. What is important is that the rectangular data can be acquired.

For the same reflection target 5, three images have been acquired and coordinates in each of the images have been acquired.

Since the three images have been acquired at the times t1, t2 and t3, the horizontal angle and the vertical angle of the optical axis 12 vary corresponding to the times t1, t2 and t3. From coordinates of a diagonal vertex of rectangle (i.e. coordinates in the photodetection area 43) acquired from the reflection target images 44-1, 44-2 and 44-3 and from directional angles (horizontal angle and vertical angle) of the optical axis 12 of each image, absolute coordinates of the diagonal vertex (two-dimensional coordinates) are obtained, and the rectangles are overlapped on each other based on the absolute coordinates. It is to be noted that the directional angle is measured by the vertical angle measuring unit 31 and the horizontal angle measuring unit 32.

Or, directions of the optical axis 12 are made to coincide based on the detection results of the vertical angle measuring unit 31 and the horizontal angle measuring unit 32. For instance, three images are made to coincide with the direction of the optical axis 12 acquired at the time t1 and three rectangles 45-1, 45-2 and 45-3 are further overlapped on each other.

If the reflection target image 44 is obtained with respect to the same reflection target 5, the rectangles 45-1, 45-2 and 45-3 show one portion or all of the reflection target images 44, which naturally overlaps on each other. That is, if even one portion of a plurality of the reflection target images 44 obtained are overlapped on each other, the reflection target images are judged as a reflection target image 44 of the same reflection target 5.

Figure 6C:
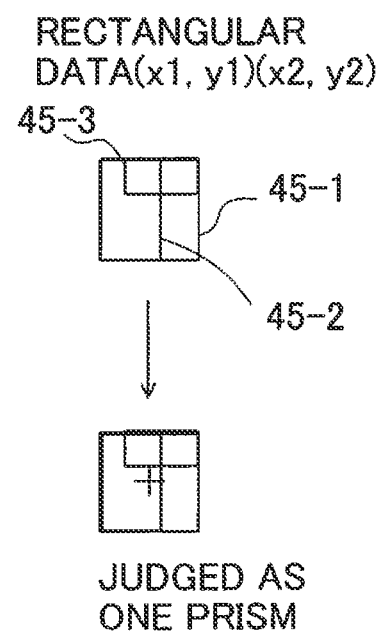
FIG. 6C is an explanatory drawing of an integrating operation of a rectangular data acquired in the image processing.

The aspect of the overlapping of rectangles is shown in FIG. 6C. Because the reflection target images 44 acquired are with the same magnification factor and at the same distance, the rectangle 45-1 of a perfect image will be the largest. Further, the rectangles 45-2 and 45-3 are each included in the rectangle 45-1 respectively. A middle point of a 2-point coordinates of diagonal vertexes of the rectangle (rectangle 45-1 in the figure) including all rectangles will be the directional angle of the reflection target 5.

It is to be noted that in a case where a perfect image of the reflection target 5 cannot be obtained, if the minimum square including an obtainable plurality of rectangles 45 is acquired, the square is regarded as a rectangle surrounding a perfect image.

Here, it is assumed that a rectangle obtained by the integrated processing, i.e. a rectangle to surrounding a perfect reflection target image 44 is regarded as a main rectangle 46. A rectangle data relating to the main rectangle 46 indicates a position (directional angle) of the reflection target 5 and also indicates the size of the reflection target image 44.

Rectangular data of the main rectangle 46 acquired for each of the reflection targets 5 are associated with each of the reflection targets 5 and stored in the storage part 28. Or, the data are transmitted to the base station PC 6 and are stored at the base station PC 6. The rectangular data thus stored are used as a masking data when performing the long distance searching.

The integrated processing as described above is executed for all of the reflection targets (hereinafter referred as "short distance reflection targets") 5 positioned at short distance and directional angles of all the short distance reflection targets 5 are measured (angle measurement). Further, the data of angle measurement are associated with each of the short distance reflection targets 5 and are stored in the storage part 28. Or, the data are transmitted to the base station PC 6 and are stored at the base station PC 6.

When the integrated processing has been completed for all of the short distance reflection targets 5, going back to Step 02, the light amount is set up to the light amount (e.g. maximum light amount) for long distance searching.

When the light amount is set up to the light amount for long distance searching, the procedures of Step 03 to Step 07 are executed similarly to the case of the short distance searching and a searching is performed with respect to the reflection targets 5 positioned at long distance. All reflection targets positioned at short distance and at long distance are included in the images obtained by the long distance searching.

When the searching for the entire searching range has been completed, it is judged in Step 08 as to whether the completed searching is the short distance searching or the long distance searching. If it is judged as long distance searching, the procedure goes up to Step 10.

(Step 10) Based on the images acquired by the long distance searching, the integrated processing is carried out.

Based on the judgment as to whether in Step 08, a target position is at short distance or at long distance and based on the rectangular data acquired in the integrated processing of Step 09, short distance target images are removed, and the integrated processing is carried out based on the long distance target images only.

For the purpose of removing the short distance target images, a masking is performed on the short distance target images according to a position and a size (rectangular data) of the short distance targets as acquired in Step 09 (integrated processing).

By the execution of the masking, the integrated processing is carried out on only the long distance target images. The procedure of the integrated processing is the same as the processing to be carried out on the short distance target images, so detailed description is not given here.

When the composite directional angle measurement (coarse measurement) for all of the long distance reflection targets 5 has been completed, the results of the coarse measurement are stored in the storage part 28.

By the integrated processing of Step 09 and by the integrated processing to added with the masking in Step 10, the results of coarse measurement are obtained for all of the reflection targets 5.

Here, the range of the masking is in the size of the main rectangle 46 obtained for the reflection target 5 at the position of the corresponding reflection target 5. It is to be noted that the actual range of the masking may be a little larger than the main rectangle 46. Or, in a case where the detection of a photodetection signal from the image sensor 23 is restricted, due consideration must be given that saturation exerts influence on the pixels in the surrounding, or so that an optical ghost caused by the saturation of the short distance target image is not falsely recognized as a long distance target image and the size of a mask 47 is set up so that a predetermined allowance present with respect to the main rectangle 46 (see FIG. 7).

Figure 7:
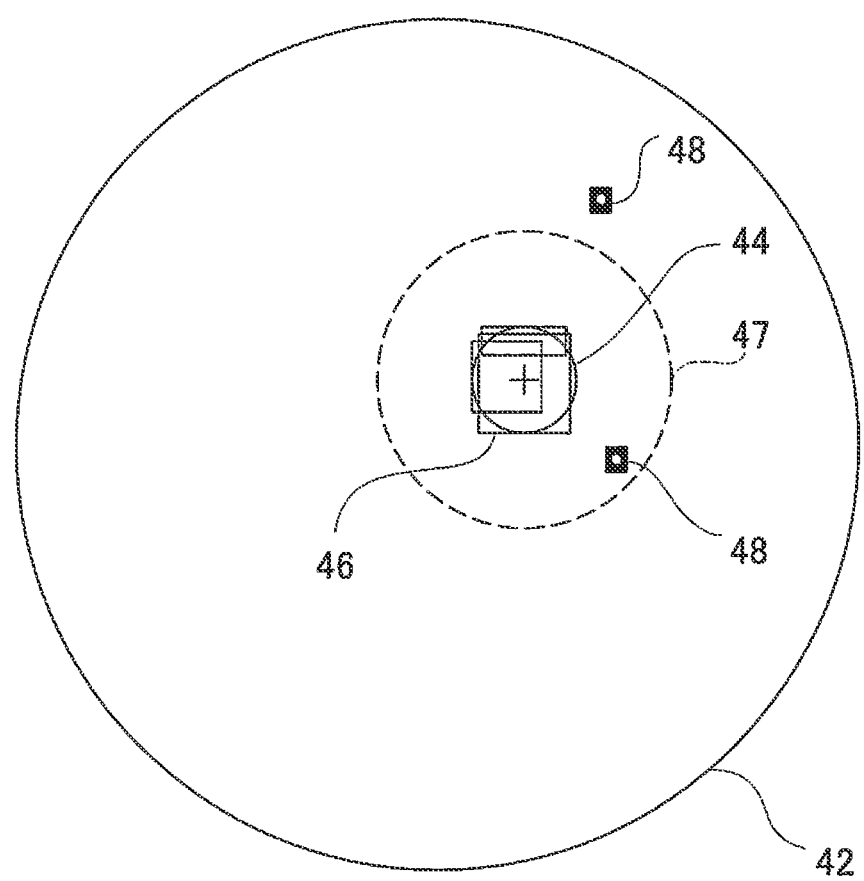
FIG. 7 is a drawing to show a relation between a rectangle surrounding a reflection target image and a range of masking.

As shown in FIG. 7, there may be the case where a long distance target image 48 is included in the range of the mask 47 by giving some allowance to the mask 47 when a long distance searching is performed. In this case, the long distance target image 48 included in the mask 47 is not recognized as a reflection target 5. Further, a long distance target image 48 positioned out of the mask 47 is recognized as a reflection target 5.

Based on the result of coarse measurement (target value), precise measurement (three-dimensional measurement) is started for all of the reflection targets 5 existing within the range of searching.

(Step 11) Based on the result of the coarse measurement, the telescope unit 2 is turned to a direction of the target value in a predetermined order, for instance, in the order of an identification number added to each of the reflection targets 5. Since the directional angle obtained by the coarse measurement as described above is accurate, if the telescope unit 2 is directed to the reflection target 5 based on the directional angle, the optical axis of the telescope unit 2 coincides with the direction of the reflection target 5.

(Step 12) When the setting of the direction of the telescope unit 2 is completed based on the composite directional angle of the coarse measurement, an automatic sighting is carried out.

The reflection target 5 intended as the object is captured by the image sensor 23 via the telescope unit 2, the reflection target 5 in the image of the image sensor 23 is detected, a deviation of the reflection target 5 with respect to the optical axis 12 is obtained, and the vertical motor 36 and the horizontal motor 37 are driven and controlled so that the deviation will be 0. The position of the reflection target 5 when obtaining the deviation can be the center of the image of the reflection target 5.

As described above, the optical axis of the telescope unit 2 coincides with the direction of the reflection target 5, and automatic sighting by the telescope unit 2 is carried out in a simple and a quick manner.

(Step 13) When sighting is completed, distance measurement is carried out by the distance measuring unit 29, and angle measurement of a vertical angle and a horizontal angle are measured by the vertical angle measuring unit 31 and the horizontal angle measuring unit 32. The distance measurement and the angle measurement are sequentially performed according to the order of automatic sighting.

The result of distance measurement and the result of angle measurement with respect to the reflection target 5 are associated with the reflection targets 5 as teaching data, and also associated with the time of measurement and are recorded and stored in the storage part 28. It is to be noted that the teaching data may be transmitted to the measuring instrument PC 3 via the communication unit 33 and may be recorded and stored in the measuring instrument PC 3.

(Step 14) When the distance measurement and the angle measurement have been carried out for all of the reflection targets 5, the teaching operation is completed.

The result of distance measurement and the result of angle measurement with respect to all of the reflection targets 5 are associated with reflection targets 5 as teaching data, and also associated with the time of measurement and are recorded and stored in the storage part 28. It is to be noted that the teaching data may be transmitted to the measuring instrument PC 3 via the communication unit 33 and may be recorded and stored in the measuring instrument PC 3.

The measuring instrument PC 3 controls the measuring instrument 1 in such a manner that the measuring instrument 1 performs searching, sighting and distance measuring sequentially of all prisms based on the teaching data at a predetermined time interval, and carries out monitoring measurement. Monitoring measurement may be performed while increasing or decreasing the light amount, according to the existing position of the reflection target 5. Or, monitoring measurement may be performed for the reflection target 5 at short distance while maintaining the light amount for short distance. Then, the light amount may be switched over to the light amount for long distance and monitoring measurement may be performed for the reflection target 5 at long distance while carrying out the masking processing.

It is judged as to whether the reflection target is positioned at short distance or at long distance and based on the judgement, the distance measuring light is switched over to the light amount for short distance or to the light amount for long distance and searching or monitoring measurement is carried out. As a result, the range of measurement is extensively expanded.

It is to be noted that in the embodiment as described above, a searching operation and a coarse measurement are performed for the reflection targets 5 at a short distance and the searching operation and the coarse measurement are performed for the reflection targets 5 at long distance by changing the light amount. Then, based on the results of both the coarse measurements, a precise measurement is carried out for all of the reflection targets 5. However, a searching operation, a coarse measurement and a precise measurement may be performed for the reflection targets 5 at short distance, and then changing the light amount, a searching operation, a coarse measurement and a precise measurement may be performed for the reflection targets 5 at long distance.

Further, in the embodiment as described above, in a case where the precise measurement is performed, a position of the reflection targets 5 on the image is obtained by executing the integrated processing. However, if due consideration is given on the size of the masking, i.e. by setting the size of the masking to a size with some allowance, a position of the reflected target image on the image may be directly obtained from the image without performing the integrated processing.

The invention claimed is:

1. A measuring method for performing monitoring measurement on two or more objects to be measured by a measuring instrument, which comprises a telescope unit for sighting an object to be measured, a distance measuring unit for projecting a distance measuring light through said telescope unit and for measuring a distance to said object to be measured, an angle detecting unit for detecting a directional angle in sighting direction of said telescope unit and an automatic sighting unit, for carrying out automatic sighting on said object to be measured by said telescope unit by projecting a sighting light in sighting direction and for acquiring digital images with an image pickup unit, comprising:

a step of setting up a searching range,
a light amount switch-over step of switching over a light amplitude of projected sighting light to a light amplitude for a short distance or for a long distance,
a short distance searching step of searching the searching range at the light amplitude for short distance and of performing a coarse measurement on the objects to be measured as positioned at short distance,
a long distance searching step of searching the searching range at the light amplitude for long distance and of performing a coarse measurement on the objects to be measured as positioned at long distance and
a precise measurement step of carrying out automatic sighting on all objects to be measured based on the result of coarse measurement of said short distance searching and on the result of coarse measurement of said long distance searching and of distance measurement and angle measurement on each of the objects to be measured,
wherein said short distance searching step comprises:
a scanning step of scanning said searching range through said telescope unit,
an image acquiring step of acquiring digital images using the image pickup unit at a predetermined time interval in the process of scanning,
a directional angle measuring step of measuring a directional angle at the time of image acquisition using the angle detecting unit,
an image position detecting step of detecting an image of the objects to be measured in said digital image and of detecting an image position of the image of the objects to be measured, and
a coarse measurement step of measuring a composite directional angle of each of the objects to be measured based on the result of directional angle measurement and the result of detection of image position,
wherein said long distance searching step comprises:
a scanning step of scanning said searching range through said telescope unit,
a digital image acquiring step of acquiring digital images using the image pickup unit at a predetermined time interval in the process of scanning,
a directional angle measuring step of measuring directional angle at the time of image acquisition using the angle detecting unit,
an image position detecting step of detecting an image of the object to be measured in said digital images, of performing a masking processing of images on the objects to be measured positioned at a short distance based on the result of said coarse measurement as acquired by said short distance searching and detecting an image position of the image of object to be measured positioned at long distance, and
a coarse measurement step of measuring a composite directional angle of each of the objects to be measured based on the result of directional angle measurement and the result of the detection of image position.

2. A measuring method according to claim 1, wherein said image acquiring step acquires digital images at a predetermined time interval so that there will be two or more images including a same object to be measured, and wherein said image position detecting step comprises a rectangle setting step of detecting an image of the objects to be measured in said digital image and setting a minimal rectangle surrounding said image of the objects to be measured, an integrated processing step of overlapping said minimal rectangles obtained from two or more digital images and acquiring rectangular data as set up so as to include all of the overlapped rectangles and a step of calculating deviation between a center of a rectangle and a sighting axis based on said rectangular data as acquired.

3. A measuring method according to claim 2, further comprising a precise measurement step of making said telescope unit to automatically sight on said objects to be measured sequentially based on said directional angle as stored and performing a distance measurement and an angle measurement, and a step of associating measurement results obtained by said precise measurement with said objects to be measured and acquiring the measurement results as initial value.

4. A measuring method according to claim 1, further comprising a precise measurement step of making said telescope unit to automatically sight on said objects to be measured sequentially based on said directional angle as stored and performing a distance measurement and an angle measurement, and a step of associating measurement results obtained by said precise measurement with said objects to be measured and acquiring the measurement results as initial value.

5. A measuring instrument, comprising
a telescope unit for sighting an object to be measured,
a distance measuring unit for projecting a distance measuring light through said telescope unit and for measuring a distance to said object to be measured,
an angle detecting unit for detecting a directional angle in sighting direction of said telescope unit,
an automatic sighting unit for carrying out automatic sighting on said object to be measured by said telescope unit by projecting a sighting light in sighting direction and for acquiring digital images with an image pickup unit,
an arithmetic processing part, and
a storage part,
wherein said distance measuring unit can change the light amount of the distance measuring light for short distance and for long distance, said arithmetic processing part rotates said telescope unit in horizontal direction and in vertical direction respectively with light amount for short distance and with light amount for long distance, said telescope unit scans in a predetermined range as set so as to include two or more objects to be measured, said automatic sighting unit acquires digital images at the predetermined time interval so that there will be two or more images including the same object to be measured, said arithmetic processing part detects the objects to be measured in said digital image, calculates a composite directional angle of said objects to be measured based on detection results of said angle detecting unit at the time of image acquisition and based on position of the image of the object to be measured in said digital image, makes said storage part store composite directional angle of the object to be measured as target value for automatic sighting by associating with each of the objects to be measured, and further, said arithmetic processing part performs masking processing based on composite directional angle acquired at short distance and restricts the acquisition of composite directional angles of the object to be measured as positioned at short distance in a case where a composite directional angle of the object to be measured is calculated by the light amount for long distance.

6. A measuring instrument according to claim 5, wherein said arithmetic processing part sets up a minimal rectangle surrounding the image of the object to be measured, overlaps said minimal rectangles obtained at two or more digital images and acquires a data of rectangle as set up so that all of the overlapped rectangles are included, calculates a composite directional angle of each of said objects to be measured respectively based on a deviation between the center of rectangle as obtained based on the rectangular data and a sighting axis and based on the detection result from said angle detecting unit, associates said composite directional angle with each of the objects to be measured, and makes said storage part store directional angles of the objects to be measured as target values for automatic sighting.

7. A measuring instrument according to claim 5, wherein said arithmetic processing part makes said automatic sighting unit sequentially execute automatic sighting on said telescope unit to said objects to be measured based on said target value stored in said storage part, execute a precise measurement for distance measurement and angle measurement and associates the results of measurement obtained by said precise measurement with said objects to be measured and acquires the results of measurement as initial value.

* * * * *